E. HAMILTON.
MACHINE FOR MAKING COPPER TUBES.
No. 7,397. Patented May 28, 1850.
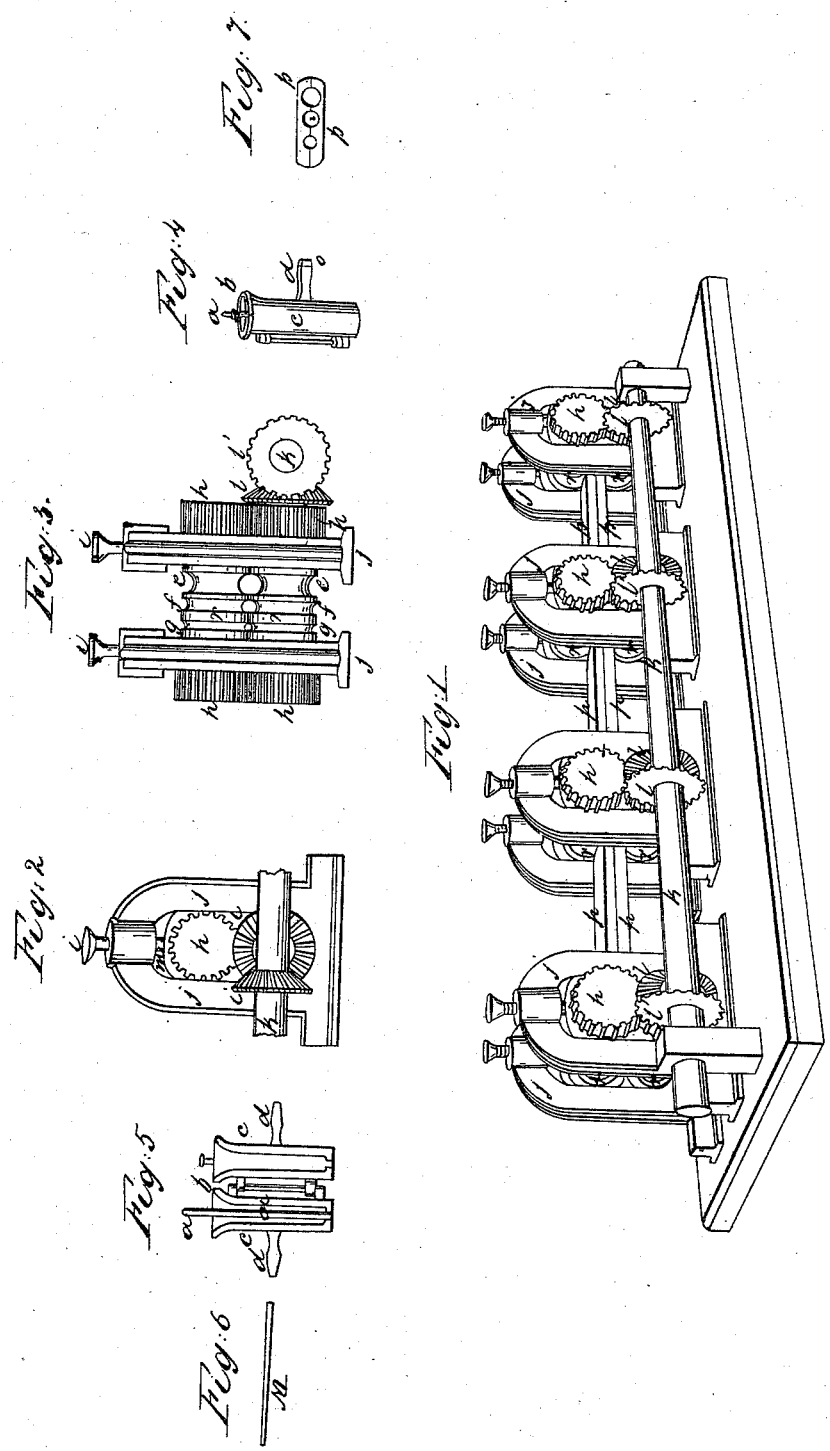

UNITED STATES PATENT OFFICE.

EDWARD HAMILTON, OF BRIDGEPORT, CONNECTICUT.

MACHINERY FOR MAKING COPPER TUBES.

Specification of Letters Patent No. 7,397, dated May 28, 1850.

*To all whom it may concern:*

Be it known that I, EDWARD HAMILTON, of the town of Bridgeport, in the county of Fairfield and State of Connecticut, have invented a new and useful Mode of Retaining the Heat of the Copper Tubes in Passing from One Pair of Rollers to the Succeeding Pairs Employed in the Process of Rolling Copper Tubes Without Seams from Cylindrical Ingots, which is described as follows, reference being had to the annexed drawings of the same, making part of this specification.

Figure 1 is a perspective view of the machine arranged for operation. Fig. 2 is an elevation of one side of the frame, containing a pair of drawing rollers and a set of gear wheels for turning the same. Fig. 3 is an elevation of the end of the machine, at which the cylindrical piece of copper is introduced that is to be rolled into a tube. Fig. 4 is a perspective view of the mold in which the cylinder of copper is molded that is designed to form the tube. Fig. 5 is an elevation of the mold in an open position showing the tapered mandrel that is to form the bore of the cylindrical ingot. Fig. 6 is one of the mandrels on which the tube is rolled. Fig. 7 is a transverse section of one of the conductors and heat retainers.

Similar letters in the several figures refer to corresponding parts.

The machine that I use to make copper tubes from cast ingots that require to be heated in the process of manufacture consists of four or more pairs of channeled rollers $r$, Figs. 1 and 3, for rolling or stretching the cylindrical ingots of copper on the conical mandrels, Fig. 6, arranged in and supported by housings or pedestals $j$, of the usual form and arrangement employed in common rolling mills, placed at a convenient distance apart, say about seven feet, having arranged between them horizontal channeled conductors and heat retainers $p$ for conducting the heated ingots of copper and the mandrels in the center of the same successively to the several pairs of rollers during the operation of rolling or stretching them into thin tubes, and for retaining them in a heated state, by confining the heat in said conductors during the said operation.

The rollers are geared together by cog wheels $h$ in the usual manner, except that the axles of the lower rollers are provided with bevel wheels $l$ geared to bevel wheels $l'$ on a main driving shaft $k$ by which all the rollers are caused to revolve together at the same degree of velocity by the application of any convenient power to said driving shaft.

There are to be three or more parallel channels $e$, $f$, $g$, of different diameters made around each roller each being a semi-circle in the cross section so that when the peripheries of each pair of rollers are brought together and in close contact, which must be done in every case, the form of each channel at the touching points of the rollers will be that of a circle corresponding in diameter with that of the required diameter of the tube after being passed through between the rollers—the channels $e$ being about one-sixteenth of an inch less in diameter than the cylindrical ingot when it comes from the mold; and the channel $g$ (when three channels are used) being the outside diameter of the tube when finished.

The channels in the conductors and heat retainers are each composed of two metallic plates $p$, $p$, channeled on the faces that are brought together in parallel semi-circular channels as represented in Fig. 7. The lower plate is let into grooves in the housings $j$. The upper plate is clamped or screwed to the lower plate, or secured in any convenient way.

The several ingots to be rolled down into thin tubes, being properly cast and placed on the mandrels are caused to pass through the heat retaining conducting tubes, and between the rollers, large end foremost, by keeping up a continuous row of mandrels and ingots in the channel, so that the succeeding mandrels shall push the preceding mandrels forward by the friction of the rollers on the ingots.

The object of rolling and stretching the tube on conical mandrels instead of cylindrical rods by passing the mandrels between the rollers, with the large end foremost, is to form the tube without flaws or imperfect places, or injuring the metal; the tapered form of the mandrel allowing room for the metal to spread, or be stretched without crowding the particles of metal against each other to such a degree as to injure the tube.

Having thus fully described my mode of making seamless copper tubes, what I claim as my invention and desire to secure by Letters Patent is, The employment of the horizontal heat retaining conducting tubes $p$, in combination with the grooved rollers $r$, arranged and operating in the manner, and for the purpose herein set forth.

In testimony whereof I have hereunto signed my name before two subscribing witnesses.

EDWARD HAMILTON.

Witnesses:
   WM. P. ELLIOT,
   E. F. BISHOP.